United States Patent
Lin et al.

(10) Patent No.: US 10,809,759 B2
(45) Date of Patent: Oct. 20, 2020

(54) APPLICATION COMPATIBLE LEAP SECOND SUPPORT

(71) Applicant: Microsoft Technology Licensing, LLC, Redmond, WA (US)

(72) Inventors: Jason Lin, Bellevue, WA (US); Mehmet Iyigun, Kirkland, WA (US); Daniel F. Cuomo, Jr., Redmond, WA (US); Keith Loren Mange, Beaux Arts, WA (US); Sarath Madakasira, Bothell, WA (US); Travis Luke, Carnation, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 234 days.

(21) Appl. No.: 16/121,511

(22) Filed: Sep. 4, 2018

(65) Prior Publication Data
US 2020/0073434 A1    Mar. 5, 2020

(51) Int. Cl.
*G06F 1/12* (2006.01)
*H04N 21/8547* (2011.01)

(52) U.S. Cl.
CPC ........... *G06F 1/12* (2013.01); *H04N 21/8547* (2013.01)

(58) Field of Classification Search
CPC .......... G06F 1/12; G06F 1/14; H04N 21/8547
See application file for complete search history.

(56) References Cited

U.S. PATENT DOCUMENTS

| 5,566,180 A | 10/1996 | Eidson et al. |
| 2010/0037081 A1* | 2/2010 | Froehlich ................. G06F 1/14 713/502 |
| 2018/0069728 A1* | 3/2018 | Kitazato ............ H04N 21/2362 |
| 2019/0226554 A1* | 7/2019 | Finlow-Bates ......... F16F 15/31 |

OTHER PUBLICATIONS

"Data elements and interchange formats Information interchange Representation of dates and times", In ISO 8601, 2004, 3 Pages.
"Definitions and Terminology for Synchronization Networks", In International Telecommunications Union, Aug. 1, 1996, 27 Pages.
"Information technology—Portable Operating System Interface", In ISO/IEC 9945, 2003, 4 Pages.
(Continued)

*Primary Examiner* — Terrell S Johnson
(74) *Attorney, Agent, or Firm* — Workman Nydegger

(57) ABSTRACT

Exposing a leap second to a plurality of applications includes identifying a system setting enabling leap second support and that a positive leap second should be added to the end of a chosen date. Based on the system setting enabling leap second support and based on the occurrence of the positive leap second, a first conversion component is exposed to a first application. The first conversion component presents, over a period of two seconds of actual time, a last second of the chosen date as if it is one second of system time. Based on the system setting enabling leap second support, based on the occurrence of the positive leap second, and based on a second application opting in to leap seconds, a second conversion component is exposed to the second application. The second conversion component presents an extra 61st second of system time at the end of a last minute of the chosen date.

20 Claims, 4 Drawing Sheets

(56) References Cited

OTHER PUBLICATIONS

"Secure Hash Signature Standard (SHS)", In Federal Information Processing Standards Publication 180-2, Aug. 1, 2002, 84 Pages.
"The Keyed-Hash Message Authentication Code (HMAC)", In Federal Information Processing Standards Publication, Mar. 6, 2002, 21 Pages.
"Time Service Department", Retrieved From: https://tycho.usno.navy.mil/time.html, Oct. 15, 2018, 1 Page.
Allan, et al., "Fine-tuning time in the Space Age", In Proceedings of the IEEE Spectrum vol. 35, Issue 3, Mar. 1, 1998, 10 Pages.
Allan, et al., "The science of timekeeping", In Hewlett Packard Application Note 1289, Jun. 1, 1997, 88 Pages.
Deering, et al., "Internet Protocol, Version 6 (IPv6) Specification", In Proceedings of the Internet Engineering Task Force RFC 2460, Dec. 1, 1998, 32 Pages.
Hinden, et al., "IP Version 6 Addressing Architecture", In Proceedings of the Internet Engineering Task Force RFC 4291, Feb. 1, 2006, 25 Pages.
Krawczyk, et al., "HMAC: Keyed-Hashing for Message Authentication", In Proceedings of the Internet Engineering Task Force RFC 2104, Feb. 1, 1997, 9 Pages.
Madson, et al., "The Use of HMAC-SHA-1-96 within ESP and AH", In Proceedings of the Internet Engineering Task Force RFC 2404, Nov. 1, 1998, 7 Pages.
Mills, D. L., "A Kernel Model for Precision Timekeeping", In Proceedings of the Internet Engineering Task Force RFC 1589, Mar. 1, 1994, 37 Pages.
Mills, David L., "Network Time Protocol (Version 3)", In Proceedings of the Internet Engineering Task Force RFC 1305, Mar. 1, 1992, 120 Pages.
Mogul, et al., "Pulse-Per-Second API for UNIX-like Operating Systems", In Proceedings of the Internet Engineering Task Force RFC 2783, Mar. 1, 2000, 31 Pages.
Postel, J., "Internet Protocol", In Proceedings of the Internet Engineering Task Force, RFC 791, Sep. 1, 1981, 50 Pages.
Postel, J., "User Datagram Protocol", In Proceedings of the Internet Engineering Task Force RFC 768, Aug. 28, 1980, 3 Pages.
Rijsinghani, A., "Computation of the Internet Checksum via Incremental Update", In Proceedings of the Internet Engineering Task Force RFC 1624, May 1, 1994, 6 Pages.
Sullivan, et al., "Characterization of clocks and oscillators", In NIST Technical Note 1337, Mar. 1, 1990, 357 Pages.
Wang, et al., "Improvements to boundary clock based time synchronization through cascaded switches", In Conference on IEEE 1588, Oct. 2, 2006, 41 Pages.

\* cited by examiner

APPLICATION COMPATIBLE LEAP SECOND SUPPORT

BACKGROUND

Computer systems and related technology affect many aspects of society. Indeed, the computer system's ability to process information has transformed the way we live and work. Computer systems now commonly perform a host of tasks that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

As computer systems became more interconnected, it was recognized that for many applications or services it is important, and sometimes even critical, that the clocks of different computer systems stay synchronized to a high degree of accuracy. This can be particularly true when different network-connected computer systems cooperate in providing and consuming distributed services. For example, some services record events (the sending/receiving of messages, the beginning/end of transactions, etc.) based on timestamps, and if the clocks of participating computer systems are out of sync with each other, these events could be recorded in an improper order. This could lead to data corruption, processing or communications errors, or even security vulnerabilities or other opportunities for malicious exploitation.

As such, time synchronization protocols were developed to synchronize computer systems' clocks to reliable and trusted sources, such computer systems whose clocks are reckoned by atomic clocks. These time synchronization protocols generally synchronize system clocks to a time that is based on Universal Time Coordinated (UTC). While various time synchronization protocols exist, one of the oldest and most widely used is the Network Time Protocol (NTP), which can often maintain time to within a threshold of tens of milliseconds between computer systems communicating over the public Internet and can achieve better than one millisecond accuracy between computer systems communicating over local area networks.

A Gregorian calendar year is generally regarded as containing 365 days. However, it actually takes the Earth roughly 365.2421 days to complete its yearly orbit around the Sun (known as a tropical year, or solar year). In order to mitigate drift between the calendar year and the solar year, the Gregorian calendar inserts an additional "leap day" (i.e., February $29^{th}$) into most calendar years that are divisible by four, such that those "leap years" have 366 days. More particularly, every year that is exactly divisible by four is a leap year, except for years that are exactly divisible by 100; but these centurial years are leap years if they are exactly divisible by 400. The occurrence of leap years is therefore highly predictable and has been long been accounted for by computer software and time synchronization protocols.

While leap days ensure that calendar years stay roughly in sync with solar years, leap seconds are used to correct drifts between astronomical time (reckoned based on the Earth's measured rotation) and the UTC standard (reckoned by atomic clocks) due to variances in the Earth's rotation. In particular, the amount of time it actually takes the Earth to complete its revolutions can be different than the length of a day (i.e., 24 hours) used on our clocks, resulting in a gradual drift between astronomical time and UTC. While the Earth's rotational speed is gradually slowing (i.e., the length of the day is estimated to have been about 21 hours 600 million years ago), its rotational period can also be affected by a variety of factors, such as climatic and geological events. As such, there is variability in the length of the day that is not entirely predictable. As a result, leap seconds are introduced when there has been a sufficient measured drift between astronomical time and UTC. Since leap seconds are identified based on actual measurements of the Earth's rotation, unlike leap days their occurrence cannot be reliably predicted. Complicating matters, leap seconds may not always add time to UTC—there could theoretically be negative leap seconds that deduct time from UTC.

The UTC standard prefers adjusting for leap seconds on the last second of the last day of December or June, with the last day of March or September as second preference, and the last day of any other month as third preference. If a leap second is positive, it is added after the $60^{th}$ second in the last minute of the chosen day (i.e., such that the minute has 61 seconds); if a leap second is negative, the $60^{th}$ second in this "leap minute" is skipped (i.e., such that the minute only has 59 seconds). Leap seconds are generally announced only a few months prior to their occurrence (e.g., in January for a June leap second, or in July for a December leap second). Unlike leap days, leap seconds are difficult to account for in computer software and time synchronization protocols due to their unpredictability.

Existing solutions that account for leap seconds in computer software and time synchronization protocols generally operate to mask the occurrence of the leap seconds. In general, these solutions configure a time synchronization protocol and/or an operating system to produce a clock that counts 60 seconds in the minute in which the leap second is added (or removed, in the case of a negative leap second), when there were actually 61 seconds (or 59 seconds, in the case of a negative leap second) in that minute according to UTC. One manner of masking the occurrence of a leap second is to spread or "smear" that leap second across a period of hours before and/or after the leap second, by making each second counted by a clock during the smearing period longer than the standard UTC-defined length of a second. One implementation from GOOGLE, for example, uses a 20-hour linear smear that slows down NTP server clocks 0.0014 percent for 10 hours both before and after a positive leap second. Thus, these NTP servers essentially lie about the true length of each second during the smearing period and are therefore out of sync with UTC; at times during the smearing period sync errors can reach as much as ±0.5 seconds.

Smearing and other masking techniques have the advantage of application compatibility—i.e., operating systems and/or software that rely on a smeared clock can remain ignorant to the existence of a leap second, and therefore do not need to be modified to be aware of and account for leap seconds. However, this can be highly problematic for applications that are highly time-sensitive. While the drift between a smeared clock during a smearing period and UTC (e.g., as much as ±0.5 seconds in the example above) is relatively small in terms of human perception, it can be devastating in terms of computer systems that process/communicate large numbers of transactions/requests per second. As a result, smearing and other masking techniques can lead to all the problems (e.g., data corruption, processing or communications errors, security vulnerabilities, opportunities for malicious exploitation, etc.) that can occur when computer system's clocks are out of sync with each other and/or with UTC.

BRIEF SUMMARY

At least some embodiments herein provide both correctness and compatibility focused mechanisms for a computing system to account for the occurrence of leap seconds (whether they be positive or negative), by interpreting a system clock in different ways for different applications based on each application's capability (i.e., awareness of leap seconds or not). Depending on application capability, embodiments herein either expose a first conversion component that provides a "true" system clock interpretation that alters the number of seconds in a leap minute (i.e., for leap second-aware applications), or expose a second conversion component that provides a "compatible" system clock interpretation that presents 60 seconds in a leap minute but that either speeds up or slows down the last second in the leap minute to account for the leap second in a manner that is transparent to the application (i.e., for leap second-unaware applications). In this manner, embodiments avoid presenting an untruthful clock for large periods of time (e.g., hours), as is the case with prior solutions such as smearing.

Some embodiments can provide a toggleable setting for enabling/disabling awareness and handling of leap seconds system-wide (e.g., at a hypervisor level, at an operating system level, at a virtual machine level, etc.). When leap seconds are enabled system-wide, some embodiments default to presenting a compatible system clock interpretation to individual applications executing within that system. However, these embodiments enable individual applications to "opt-in" to receiving a true system clock interpretation. In one implementation, the act of opting in might include, for example, those applications making one or more calls to an Application Programming Interface (API). However, this disclosure is not limited to use of API calls for opting in. For example, other implementations might enable applications to express a configuration setting preference, such as by writing one or more value to one or more files, by setting one or more values on one or more registry keys, or in any other manner known or yet known for expressing configuration settings.

Other embodiments could provide additional toggleable settings for administrative software and/or users to control how leap seconds are presented to applications on a per-application level of granularity. In some implementations, these additional toggleable settings become available when leap seconds are enabled system-wide, and enable specification of whether each application should be provided a compatible system clock interpretation or a true system clock interpretation. Hybrid embodiments could provide both these additional toggleable settings and these opt-in capabilities. Depending on implementation of these hybrid embodiments, an application's act of opting-in could override per-application toggleable settings, or per-application toggleable settings could override an application's act of opting-in.

In some embodiments, a method for exposing a leap second to a plurality of applications executing at the computer system includes identifying a system setting enabling leap second support and identifying that a positive leap second should be added to the end of a chosen date. The method also includes, based on the system setting enabling leap second support, and based on the occurrence of the positive leap second, exposing to a first application a first conversion component that presents, over a period of two seconds of actual time, a last second of the chosen date as if it is one second of system time. The method also includes, based on the system setting enabling leap second support, based on the occurrence of the positive leap second, and based on a second application opting in to leap seconds, exposing to the second application a second conversion component that presents an extra 61st second of system time at the end of a last minute of the chosen date.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
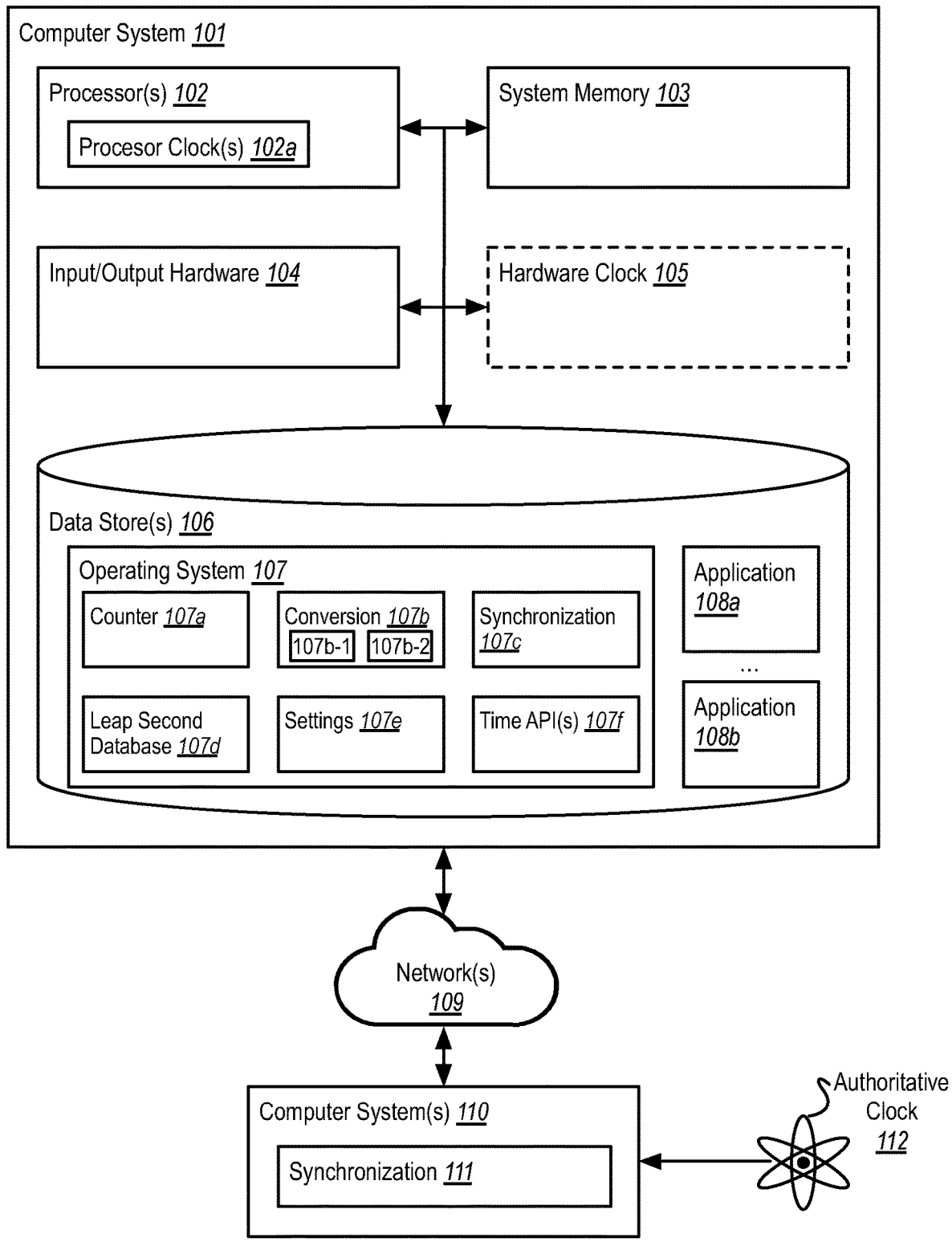
FIG. 1 illustrates an example computing environment that facilitates exposing leap seconds to a plurality of applications executing at a computer system.

At least some embodiments herein provide both correctness and compatibility focused mechanisms for a computing system to account for the occurrence of leap seconds (whether they be positive or negative), by interpreting a system clock in different ways for different applications based on each application's capability (i.e., awareness of leap seconds or not). Depending on application capability, embodiments herein either expose a first conversion component that provides a "true" system clock interpretation that alters the number of seconds in a leap minute (i.e., for leap second-aware applications), or expose a second conversion component that provides a "compatible" system clock interpretation that presents 60 seconds in a leap minute but that either speeds up or slows down the last second in the leap minute to account for the leap second in a manner that is transparent to the application (i.e., for leap second-unaware applications). In this manner, embodiments avoid presenting an untruthful clock for large periods of time (e.g., hours), as is the case with prior solutions such as smearing.

Some embodiments can provide a toggleable setting for enabling/disabling awareness and handling of leap seconds system-wide (e.g., at a hypervisor level, at an operating system level, at a virtual machine level, etc.). When leap seconds are enabled system-wide, some embodiments default to presenting a compatible system clock interpretation to individual applications executing within that system. However, these embodiments enable individual applications to "opt-in" to receiving a true system clock interpretation. In one implementation, the act of opting in might include, for example, those applications making one or more calls to an Application Programming Interface (API). However, this disclosure is not limited to use of API calls for opting in. For example, other implementations might enable applications to express a configuration setting preference, such as by writing one or more value to one or more files, by setting one or more values on one or more registry keys, or in any other manner known or yet known for expressing configuration settings.

Other embodiments could provide additional toggleable settings for administrative software and/or users to control how leap seconds are presented to applications on a per-application level of granularity. In some implementations, these additional toggleable settings become available when leap seconds are enabled system-wide, and enable specification of whether each application should be provided a compatible system clock interpretation or a true system clock interpretation. Hybrid embodiments could provide both these additional toggleable settings and these opt-in capabilities. Depending on implementation of these hybrid embodiments, an application's act of opting-in could override per-application toggleable settings, or per-application toggleable settings could override an application's act of opting-in.

While leap seconds go by practically unnoticed in terms of human perception, one second can essentially be an eternity in terms of modern processors that can execute hundreds of billions of operations per second. Since leap seconds go by practically unnoticed to humans, application software has long been written so as to be entirely ignorant of leap seconds. As a result, exposing unexpected leap seconds to most software would cause it to crash. However, the potential benefits to directly exposing leap seconds to time-critical applications are numerous. Since these two considerations are in direct conflict, accounting for leap seconds in computing systems has long proved to be a difficult challenge. As will be appreciated in view of the disclosure herein, the innovations described herein address both of these technical challenges by striking a balance between truthfully accounting for leap seconds for compatible software (e.g., by exposing 61 seconds in the last minute of a day chosen for a positive leap second), while preserving compatibility with legacy applications (e.g., by exposing 60 seconds in the last minute of chosen leap day, while still accounting for that positive leap second). Systems that implement these innovations are therefore able to remain compatible with legacy software, while at the same time being capable of being used for running time-critical applications that they could not accurately run prior to these innovations.

To the accomplishment of the foregoing, FIG. 1 illustrates an example computing environment 100 that facilitates exposing leap seconds to a plurality of applications executing at a computer system. As shown, environment 100 comprises a computer system 101 that includes one or more hardware processor(s) 102, system memory 103, input/output hardware 104 (e.g., user input hardware such as a keyboard and a mouse, networking hardware, display hardware, etc.), one or more data store(s) 106, and optionally a hardware clock 105. As shown, these hardware components are communicatively interconnected, such as by a system bus and/or other communications media.

FIG. 1 also depicts that processor(s) 102 include (or are associated with) one or more processor clock(s) 102a. Each processor clock 102a provides an oscillating signal upon which operation of its corresponding processor(s) is based. The speed of contemporary processor clocks varies, but they typically produce signals that oscillate at the rate of tens of MHz (e.g., for embedded systems) to several GHz (e.g., for desktop or server computers).

When included, a hardware clock 105 is used primarily to maintain time during periods when the computer system 101 is powered off, such that the computer system 101 can obtain a current date/time from the hardware clock 105 when it is again powered on. The hardware clock 105, which is often referred to as a Real Time Clock (RTC), can be implemented in a variety of manners, but it in many computer systems RTCs rely on crystal oscillators and are backed by a battery power source. The accuracy of RTCs can vary, but it is common for RTCs in many computers to be accurate only to within one to several seconds per day.

As shown, computer system 101 is interconnected, via one or more network(s) 109, to one or more other computer system(s) 110 from which computer system 101 receives time synchronization data. Computer system(s) 110 obtain time synchronization data (either directly or indirectly) from a reliable and authoritative clock source 112, such as an atomic clock (though the innovations herein are not limited to use of atomic clocks as authoritative clock sources). Contemporary atomic clocks are accurate to within one second over a period of time numbering in the billions of years. In most implementations, computer system(s) 110 provide time data (e.g., using synchronization component 111) to other computer systems based on the Universal Time Coordinated (UTC) standard, though the principles herein are not limited to use of UTC. Synchronization component 111 might implement any appropriate time synchronization protocol, such as the Network Time Protocol (NTP), the Precision Time Protocol (PTP), and the like. As used herein, the term "actual time" refers to time that has actually elapsed in the real world, as it would be measurable, for example, by the processor clock(s) 102a, the hardware clock 105, and/or the authoritative clock source 112.

In general, the computer system 101 retrieves computer-executable instructions from system memory 103 and executes those instructions at the one or more processor(s) 102, while storing runtime data in the system memory 103 as needed. The computer system 101 generally sources these instructions from durable data store(s) 106, placing them into system memory 103 for execution. Data store(s) 106 may exist locally (e.g., connected to the processor(s) 102 and system memory 103 via a system bus), or could exist remotely (e.g., over a network connection). The computer system 101 can also durably store results of executing the computer-executable instructions onto the data store(s) 106.

As shown, the data store(s) 106 can store a variety of executable software and data, including the depicted operating system 107 and applications 108 that are configured to execute under control of the operating system 107. As indicated by ellipses, there could be any number of a plurality of applications 108, but for compactness and ease in description FIG. 1 illustrates two applications 108—application 108a (used herein as "legacy" application) and application 108b (used herein as an "opted-in" application).

While the description herein uses the phrase "operating system," it will be appreciated that this term should be construed broadly to cover a wide variety of scenarios. For example, while the term operating system could be construed in a more classic sense—e.g., as corresponding to software such as WINDOWS, LINUX, MACOS, etc.—the term operating system could be construed more broadly to cover other types of system software, such as a hypervisor or other virtualization layer. In these instances, the depicted applications 108 might actually be more traditional operating systems (e.g., WINDOWS, LINUX, MACOS, etc.) running on top of a virtualization layer, rather than end-user software.

The depicted operating system 107 includes a plurality of components and data (e.g., 107*a*-107*f*) related to maintaining and presenting interpretations of system time, including supporting the addition or deduction of leap seconds during those interpretations. These could include, for example, the depicted counter 107*a*, conversion component 107*b*, synchronization component 107*c*, leap second database 107*d*, settings 107*e*, and time API(s) 107*f*. While the depicted components and data have been provided as an aide in describing the current innovations, it is noted that particular implementations of these innovations might choose a different identity and/or arrangement of components and data.

In general, time is presented to applications based on a conversion component 107*b* interpreting the value of a counter 107*a* (i.e., representing "system time") that is maintained by the operating system 107 during its execution at computer system 101. In implementations, the counter 107*a* stores a monotonically increasing number representing a number of incremental time units that have elapsed since a predetermined date and time (also known as an epoch). For example, when the innovations herein are operating within the WINDOWS operating system, counter 107*a* might be a number of 100-nanosecond intervals since the epoch January 1, 1601 at 00:00:00 (UTC). Alternatively, when the innovations herein are operating within a POSIX-based operating system (e.g., LINUX, FREEBSD, MACOS, etc.) counter 107*a* might be a number of seconds that have elapsed since the epoch January 1, 1970 at 00:00:00 (UTC).

When computer system 101 includes a hardware clock 105, the value of this counter 107*a* might be initialized during system startup to a value encoding a current date and time obtained from the hardware clock 105. When the computer system 101 lacks a hardware clock 105, the value of this counter 107*a* might be initialized to some default value, such as the operating system's epoch. From there, the counter 107*a* is incremented, as appropriate, by the processor(s) 102 (i.e., based on the signal produced by the processor clock 102*a*).

Since the value of the counter 107*a* will likely be inaccurate (e.g., in terms of the authoritative clock 112) upon initialization, and since the accuracy of the counter 107*a* is limited due to processor workloads and the accuracy of processor clock 102*a*, computer system 101 utilizes its synchronization component 107*c* to periodically adjust the counter 107*a* based on time synchronization data received from computer system(s) 110 (e.g., from synchronization component 111). While adjustments to the counter 107*a* could potentially be relatively sudden during system startup, during normal operation of computer system 101 the synchronization component 107*c* ensures that the value of counter 107*a* increments stably and predictably and has very little drift from the date and time received from computer system(s) 110.

As mentioned, the operating system 107 uses a conversion component 107*b* to interpret the value of a counter 107*a* to obtain and present to applications a date/time, such as a current day, month, year, hour, minute, second, millisecond, and so on. Prior to the present innovations, legacy time conversion components would entirely ignore the existence of leap seconds. As such, after the occurrence of a leap second, the system time interpretation presented to an application by a legacy time conversion component would be one second off from actual time. While time synchronization data received from computer system(s) 110 might eventually cause these legacy time conversion components to produce a system time interpretation that corresponds to an actual time that accounts for leap seconds, this is done in a manner that masks the occurrence of leap seconds—such as the use of smearing techniques described previously—that can cause significant drifts between system time and actual time over large periods of time.

In embodiments herein, however, the conversion component 107*b* is directly aware of, and can account for, leap seconds when performing conversions of the system time represented by counter 107*a*. This ensures that the time presented to applications by the conversion component 107*b* based on counter 107*a* remains in sync with actual time received from computer system(s) 110 within the tolerances afforded by the time synchronization protocol and characteristics of the network(s) 109. When doing so, the conversion component 107*b* can perform these conversions in different ways for different applications, depending on system-wide settings and/or depending on each application's awareness of leap seconds. More particularly, the same value(s) of counter 107*a* can be interpreted differently by conversion component 107*b* depending on whether or not leap second support is enabled system-wide, and/or on whether or not an application has expressly requested that leap seconds be exposed to it.

In some embodiments, the conversion component 107*b* consults settings 107*e*, which dictate whether or not the conversion component 107*b* is to account for leap seconds system-wide. If these settings 107*e* indicate that leap seconds are disabled, then conversion component 107*b* might operate as if it is a legacy time conversion component—i.e., it does not account for leap seconds at all. If these settings 107*e* indicate that leap seconds are enabled, on the other hand, then conversion component 107*b* can leverage the leap second database 107*d* to identify one or more leap seconds that should be accounted for when performing time conversions. The conversion component 107*b* can account for historic and present leap seconds for both current values of counter 107*a*, and for historic values of counter 107*a*, such as from a timestamp stored on a file. These operating system-level settings 107*e* might be configured by a user (e.g., such as a system administrator or end-user) or by software such as system management software. Additionally, in some embodiments, these operating system-level settings 107*e* persist across reboots.

The leap second database 107*d* can be any appropriate data structure that includes information sufficient to identify the occurrence of one or more leap seconds. Such information could include, for each leap second, at least an identification of the chosen date on which the leap second has occurred or will occur and whether the leap second is a positive leap second or a negative leap second. As will be appreciated by those of ordinary skill in the art, such data could be represented as a binary or a text-based (e.g., XML, CSV, JSON, etc.) data structure or file which could include, for example, one or more lists, one or more tables, one or more trees, one or more graphs, one or more arrays, and the like. The leap second database 107*d* might be distributed, pre-populated with one or more historic leap seconds, along with the operating system. Additionally, or alternatively, leap second database 107*d* could be obtained and/or updated by the operating system 107 from a remote source such as computer systems 110 and/or update server(s) operated by an operating system vendor.

In some embodiments, the conversion component 107b supports at least two types of conversion mechanisms that account for leap seconds. A first legacy conversion mechanism exposes a first conversion component 107b-1 that provides a compatible system clock interpretation to applications that have not expressly indicated that they support leap seconds (i.e., legacy applications). A second opted-in conversion mechanism exposes a second conversion component 107b-2 that provides a true system clock interpretation to applications that have indicated that they support leap seconds (i.e., opted-in applications).

An opted-in application might opt-in to receiving a true system clock interpretation in a variety of manners. For example, as shown, the operating system 107 could expose time API(s) 107f which an opted-in application (e.g., application 108b) can call in order to express its preference to receive a true system clock interpretation. In these embodiments, a developer might modify the source code of the application (and recompile the application, if appropriate for the source code language) in order leverage and call these time API(s) 107f. Additionally, or alternatively, the operating system 107 could provide in the settings 107e one or more toggleable settings for an opted-in application to express a configuration setting preference, such as by setting one or more values on one or more registry keys, altering one or more values in a text or binary file, or in any other manner known or yet known for expressing configuration settings. In either case, the API(s) 107f and/or per-application options in settings 107e might be active and/or available only when a system-wide preference to enable leap second support is enabled. If the operating system 107 lets opted-in applications opt-in using both an API call and a per-application toggleable setting, an application's act of opting-in could override its per-application toggleable setting, or the applications per-application toggleable setting could override the application's act of opting-in.

Figure 2:
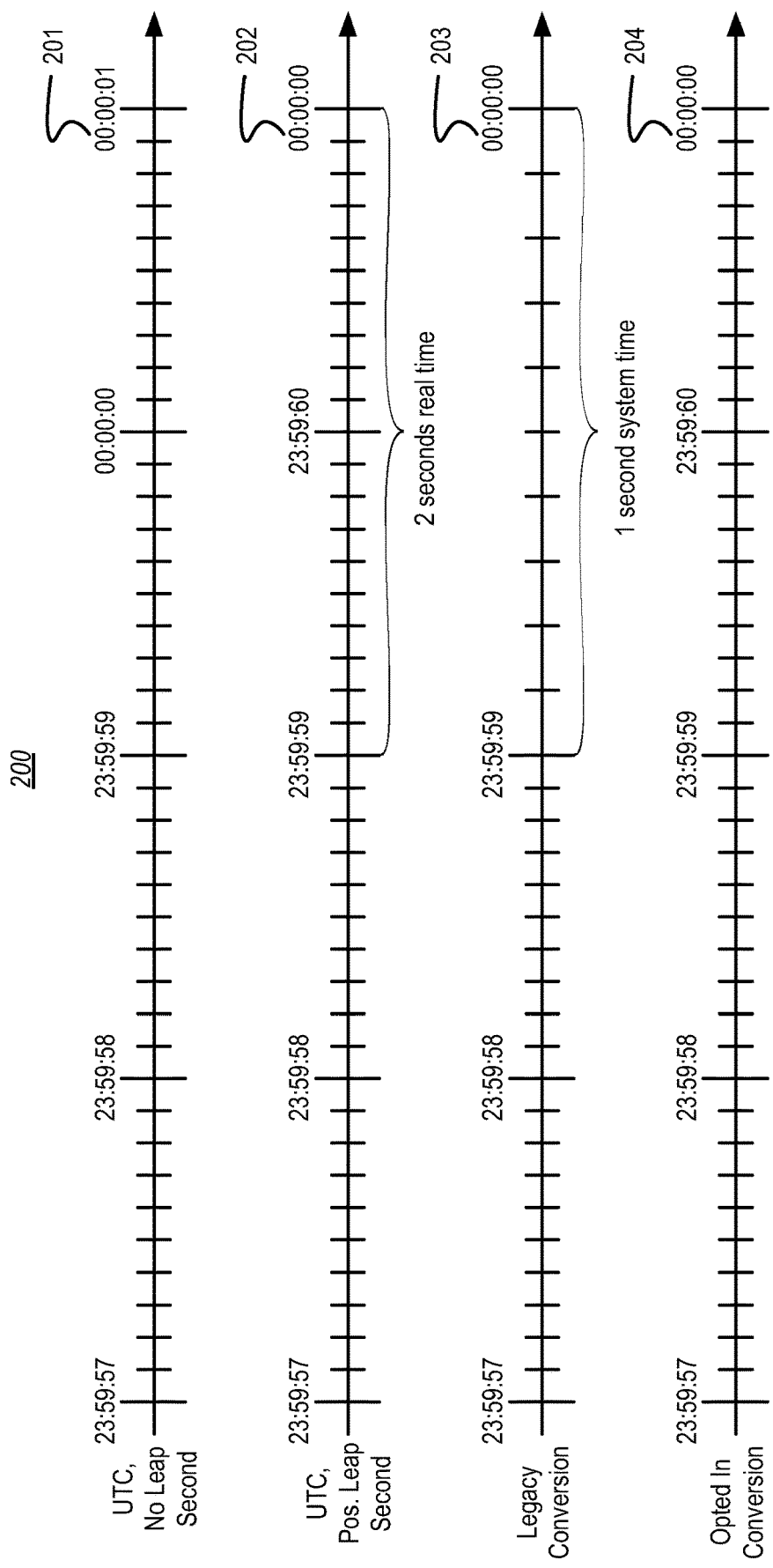
FIG. 2 illustrates an example timing diagram demonstrating a positive leap second.
Figure 3:
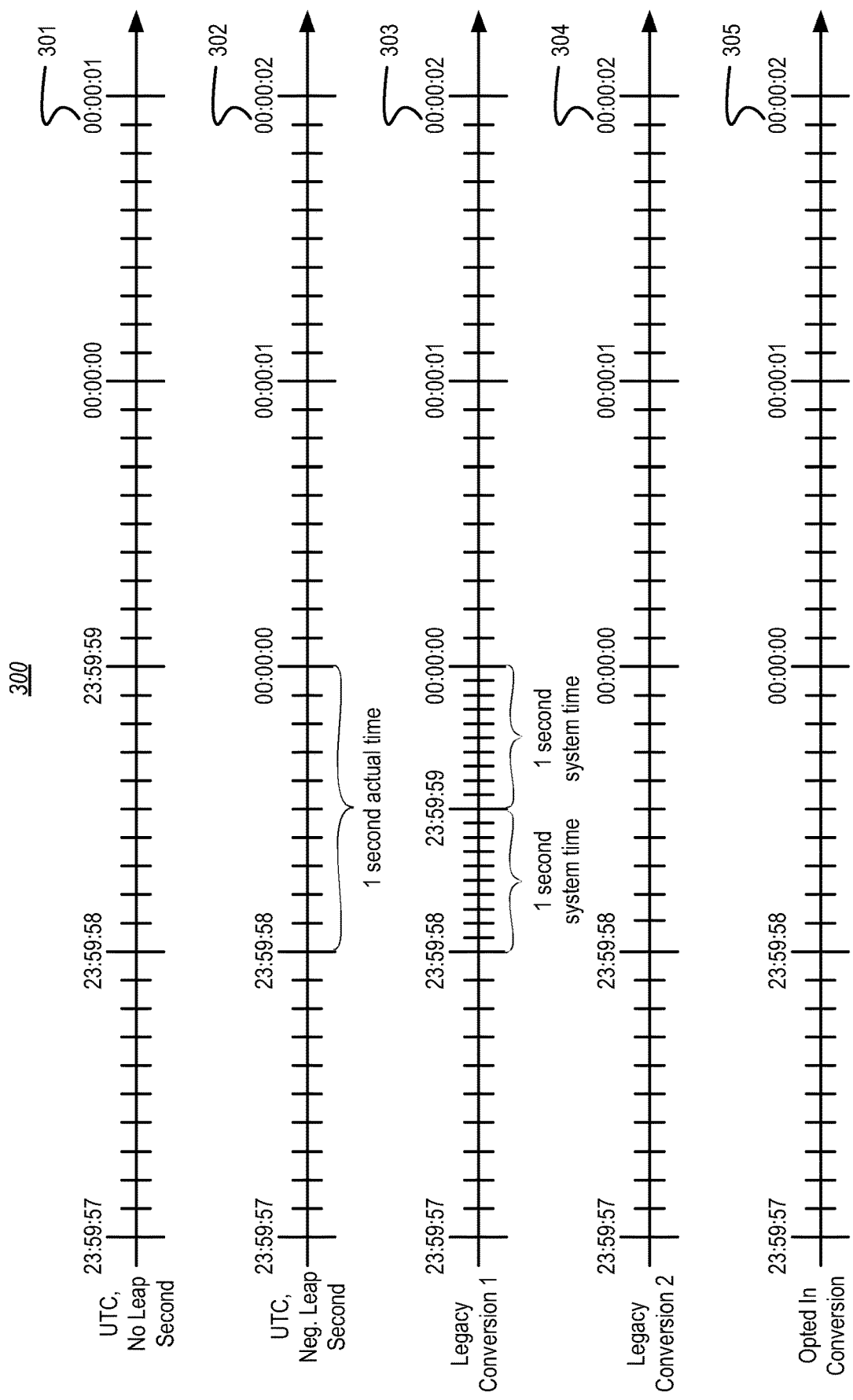
FIG. 3 illustrates an example timing diagram demonstrating a negative leap second.

In order to understand the legacy and opted-in conversion mechanisms, FIGS. 2 and 3 present timing diagrams that show how positive and negative leap seconds could be exposed to both legacy and opted-in applications as those leap seconds occur. Initially, FIG. 2 illustrates an example timing diagram 200 demonstrating presentation of a positive leap second. Timing diagram 200 includes four different timelines 201-204. Timeline 201 shows how the last minute of a first day normally transitions into the first minute of a second day under the UTC standard. As shown in timeline 201, the last minute of the first day (i.e., minute 23:59) concludes with second 59, and the first minute of the second day (i.e., minute 00:00) commences with second 00.

Timeline 202, on the other hand, shows this transition during the occurrence of a positive leap second. As shown, the positive leap second is added after second 23:59:59 UTC of a date chosen to add the leap second, with the extra second being displayed under the UTC standard as 23:59:60. As such, the last minute of the chosen date (i.e., minute 23:59) has a total of 61 seconds in it, rather than the standard 60, with the extra second being added at the very end of the this chosen date.

Timeline 203 shows how the conversion component 107b could present this extra leap second using a compatible system clock conversion component 107b-1 that is exposed to legacy applications (i.e., a legacy conversion). As shown, during a legacy conversion that includes a positive leap second, a compatible system clock interpretation follows the normal pattern of transitioning from second 59 of the first day to second 00 of the second day. The conversion component 107b-1 presents this $59^{th}$ second of system time in a manner such that, to these legacy applications, the $59^{th}$ second appears to have occupied a single second of system time. In reality, however, the conversion component 107b-1 presents this $59^{th}$ second of system time over a period of two seconds of actual time (e.g., as represented by the counter 107a). Thus, each unit of system time that is visible to the legacy applications during this $59^{th}$ second actually occupies two units of actual time. For example, if the conversion component 107b-1 exposes the $59^{th}$ second to a legacy application as 1000 ms of system time, each of these milliseconds actually occupies 2 ms of actual time. Some implementations could employ a conversion function that increments system time presented to an application one unit each time the counter 107b increments two units during these two seconds of actual time.

By presenting the positive leap second to legacy applications in this way, there is no risk of these legacy applications crashing based having exposed an unexpected $61^{st}$ second to them within a single minute. In addition, the positive leap second is accounted for in a way that substantially adheres with the UTC standard, since the leap second is added at the very end of the chosen date, rather being smeared over a number of hours. While individual visible units within this $59^{th}$ second of system time will deviate somewhat from UTC during two seconds of actual time, these deviations occur within only two seconds of actual time, rather than being spread or smeared across several hours.

Timeline 204 shows how the conversion component 107b presents this extra leap second using a true system clock conversion component 107b-2 that is exposed to applications that have opted-in to seeing this true clock (i.e., an opted-in conversion). As shown, like timeline 202, timeline 204 adds the positive leap second after second 23:59:59 of the chosen date, with the extra second being actually exposed by conversion component 107b-2 as 23:59:60. As such, opted-in applications are able to actually see the extra $61^{st}$ second and are presented an interpretation of the system clock that does not deviate from the UTC standard at all. Thus, developers of applications that are highly time-sensitive have the option of updating those application so that they can opt-in to having conversion component 107b-2 exposed to their applications so that they can receive this true system clock interpretation.

FIG. 3 illustrates an example timing diagram demonstrating 300 presentation of a negative leap second. Timing diagram 300 includes five different timelines 301-305. Initially, timeline 301 corresponds to timeline 201 of FIG. 2, and also shows how the last minute of a first day normally transitions into the first minute of a second day under the UTC standard.

Timeline 302, on the other hand, shows this transition during the occurrence of a negative leap second. As shown, a negative leap second causes second 23:59:59 UTC of the chosen date to be suppressed, so that the last minute of the chosen date (i.e., minute 23:59) has a total of 59 seconds in it, rather than the standard 60. Thus, this minute concludes with the $59^{th}$ second (i.e., second 23:59:58), which is followed immediately by second 00:00:00 of the following date. Timeline 305 shows that the conversion component 107b-2 presents this negative leap second in a true system clock interpretation in a manner that aligns with timeline 302. As such, a clock presented to opted-in applications omits the $60^{th}$ second.

Timelines 303 and 304 show two different ways in which this negative leap second might be presented by conversion component 107b-1 to legacy applications. Timeline 303 shows that a compatible system clock interpretation might actually present a $60^{th}$ second (i.e., 23:59:59) to a legacy application, while making two seconds of system time on the chosen date appear to proceed more quickly than actual time. Thus, as shown, while each of these two seconds might appear to the application have occupied one second of system time, they may in reality each take place over only half a second of actual time.

Timeline 304, on the other hand, shows that a compatible system clock interpretation might actually omit this $60^{th}$ second, just like the true system clock interpretation. This is possible because, while legacy applications may crash upon seeing a $61^{st}$ second in a single minute, they are not likely to crash if they do not see a $60^{th}$ second within a given minute. It will be appreciated that a given application may not actually execute at processor(s) 102 at all times, so in any given minute a legacy application might not actually execute during the $60^{th}$ second of a minute. In these cases, the $60^{th}$ second would not normally be exposed to application anyway. As such, while legacy applications may not deal gracefully with seeing a $61^{st}$ second, they typically execute without problems if they don't see a $60^{th}$ second. Thus, legacy applications are unlikely to crash if conversion component 107b-1 omits the last second in a day in order to account for a negative leap second. In view of timeline 304, it will be appreciated that, in the case of a negative leap second, there may be no distinction between a true system clock interpretation and a compatible system clock interpretation.

Figure 4:
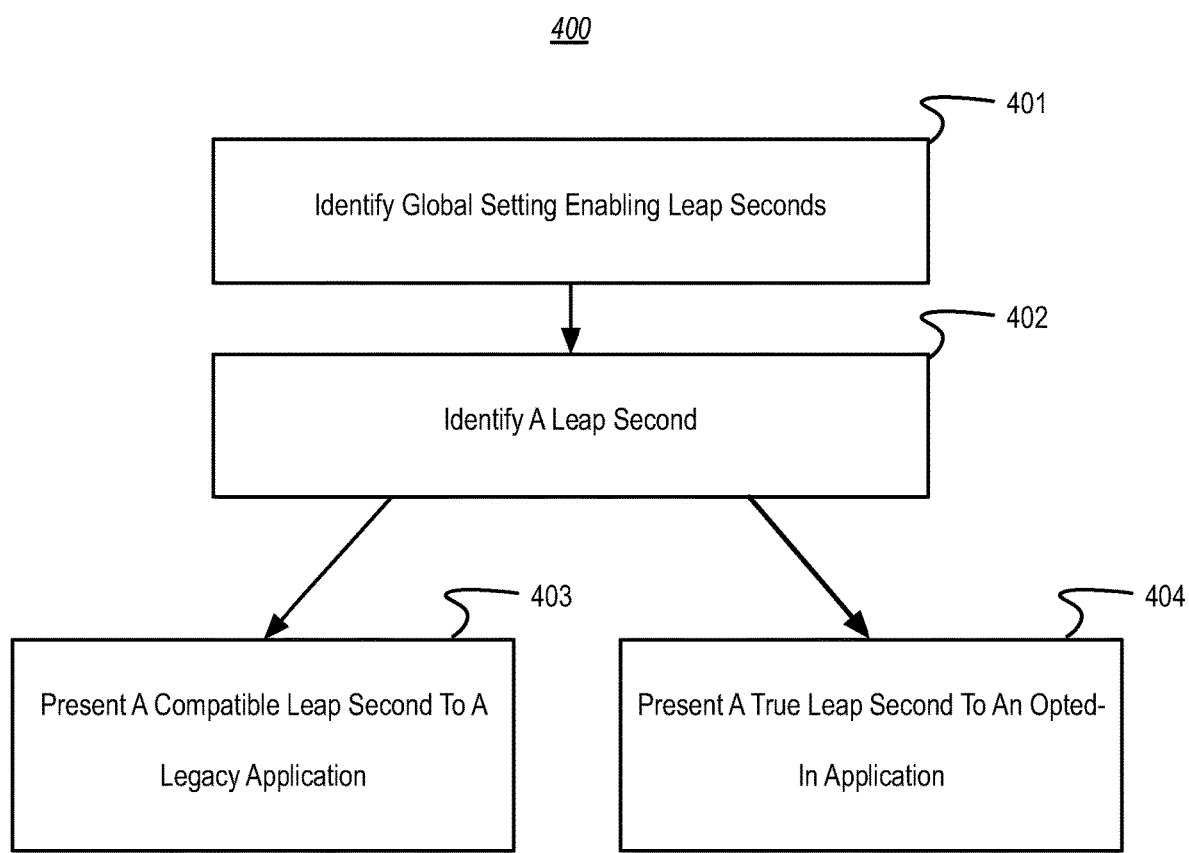
FIG. 4 illustrates a flowchart of an example method for exposing a leap second to a plurality of applications executing at a computer system.

In view of the foregoing, FIG. 4 illustrates a flowchart of an example method 400 for exposing a leap second to a plurality of applications executing at a computer system. Method 400 is described in connection with the computing environment 100 of FIG. 1 and the timing diagrams 200 and 300 of FIGS. 2 and 3.

As shown, method 400 begins with an act 401 of identifying a global setting enabling leap seconds. In some embodiments, act 401 comprises identifying a system setting enabling leap second support. For example, as shown in FIG. 1, and operating system 107 can include settings 107e, which can include a setting for enabling and disabling leap second support system-wide. As such, act 401 could include the conversion component 107b determining that this setting is enabled. In some embodiments, the system setting enabling leap second support could persist across reboots.

Method 400 also includes an act 402 of identifying a leap second. In some embodiments (e.g., when there is a positive leap second), act 402 comprises identifying that a positive leap second should be added to the end of a chosen date. For example, the conversion component 107b can consult a leap second database 107d to determine that a positive leap second has occurred, or will occur, so that it can account for that leap second when converting the counter 107a to system time. While the leap second database 107d could be located on the data store 106 (i.e., such that an indication of the occurrence of the positive leap second is retrieved from durable storage at the computer system), an indication of the occurrence of the positive leap second could also be received from a remote computer system. For example, the leap second database 107d might receive updates from a remote computer system, or the conversion component 107b could even receive the indication from a remote computer system directly.

Method 400 also includes an act 403 of presenting a compatible leap second to a legacy application. In some embodiments (e.g., when there is a positive leap second), act 402 comprises, based on the system setting enabling leap second support, and based on the occurrence of the positive leap second, exposing to a first application a first conversion component that presents, over a period of two seconds of actual time, a last second of the chosen date as if it is one second of system time. For example, during the occurrence of the identified leap second per the UTC standard, conversion component 107b-1 can present a compatible system clock interpretation to application 108a (i.e., a legacy application). As described, a compatible system clock interpretation—such as the one shown in timeline 203 of FIG. 2—exposes the $60^{th}$ second of system time over a period of two seconds of actual time, accounting for the leap second while preserving application compatibility. As discussed in connection with timeline 203, presenting the last second of the chosen date as if it is one second of system time could comprises presenting each exposed unit (e.g., 1 millisecond) of system time making up the last second of the chosen date over a period of two corresponding units of actual time (e.g., two milliseconds of time counted by counter 107a). A determination to present the compatible system clock interpretation might be based on a determination that the application 108a has not opted-in to true leap seconds. Thus, the conversion component 107b might present the compatible system interpretation clock as a default or fallback when an application has not opted-in to a true system clock interpretation.

Method 400 also includes an act 404 of presenting a true leap second to an opted-in application. In some embodiments (e.g., when there is a positive leap second), act 402 comprises, based on the system setting enabling leap second support, based on the occurrence of the positive leap second, and based on a second application opting in to leap seconds, exposing to the second application a second conversion component that presents an extra $61^{st}$ second of system time at the end of a last minute of the chosen date. For example, during the occurrence of the identified leap second per the UTC standard, conversion component 107b-2 can present a true system clock interpretation to application 108b (i.e., an opted-in application). As described, a true system clock interpretation—such as the one shown in timeline 204 of FIG. 2—exposes a $61^{th}$ second of system time, such that system time aligns with UTC (e.g., timeline 202).

As discussed, there could be different ways for an application to opt-in to a true system clock interpretation (and, therefore, leap seconds). For example, the second application could opt-in to leap seconds based on the second application making a call to API(s) 107f. In some embodiments, this API call may only be available to the second application based on the system setting enabling leap second support having been set. Additionally, or alternatively, the second application could opt-in to leap seconds based on the second application expressing an application-specific configuration setting preference, such as in settings 107e.

As shown, the presentation of different types of leap second interpretations to different application can occur in any order, or even in parallel. Additionally, method 400 is not limited to presenting compatible and true system time interpretations to only two applications. Instead, method 400 could present different interpretations of counter 107a to any number of applications 108, with any mix of legacy and opted-in applications.

Method 400, as shown in FIG. 4, can operate to adjust for negative leap seconds as well. As shown in timelines 303 and 304 of FIG. 3, for example, act 403 could present a compatible system clock interpretation either by presenting two seconds of system time over a single second of actual time (i.e., timeline 303), or by simply omitting the $60^{th}$ second (i.e., timeline 304). As shown in timeline 305, act 404 could present a true system clock interpretation by omitting the $60^{th}$ second.

Accordingly, the innovations described strike a balance between truthfully accounting for leap seconds for compatible software (e.g., by exposing 61 seconds in the last minute of a day chosen for a positive leap second), while preserving compatibility with legacy applications (e.g., by exposing 60 seconds in the last minute of chosen leap day, while still accounting for that positive leap second). Systems that implement these innovations are therefore able to remain compatible with legacy software, while at the same time being capable of being used for running time-critical applications that they could not accurately run prior to these innovations.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for exposing a leap second to a plurality of applications executing at the computer system, the method comprising:
   identifying a system setting enabling leap second support;
   identifying that a positive leap second should be added to the end of a chosen date;
   based on the system setting enabling leap second support, and based on the occurrence of the positive leap second, exposing to a first application a first conversion component that presents, over a period of two seconds of actual time, a last second of the chosen date as if it is one second of system time; and
   based on the system setting enabling leap second support, based on the occurrence of the positive leap second, and based on a second application opting in to leap seconds, exposing to the second application a second conversion component that presents an extra 61st second of system time at the end of a last minute of the chosen date.

2. The method as recited in claim 1, wherein the second application opts in to leap seconds based on the second application making an application programming interface (API) call.

3. The method as recited in claim 2, wherein the API call is available to the second application based on the system setting enabling leap second support having been set.

4. The method as recited in claim 1, wherein the second application opts in to leap seconds based on the second application expressing an application-specific configuration setting preference.

5. The method as recited in claim 1, wherein an indication of the occurrence of the positive leap second is received from a remote computer system.

6. The method as recited in claim 1, wherein an indication of the occurrence of the positive leap second is retrieved from durable storage at the computer system.

7. The method as recited in claim 1, wherein presenting the last second of the chosen date as if it is one second of system time comprises presenting each exposed unit of system time making up the last second of the chosen date over a period of two corresponding units of actual time.

8. The method as recited in claim 1, wherein the system setting enabling leap second support persists across reboots.

9. The method as recited in claim 1, further comprising:
   maintaining a counter used by the first and second conversion components.

10. The method as recited in claim 9, wherein the first and second conversion components provide different interpretations of the counter.

11. A computer system, comprising:
    one or more processors; and
    one or more computer-readable media having stored thereon computer-executable instructions that are executable by the one or more processors to expose a leap second to a plurality of applications executing at the computer system, the computer-executable instructions including instructions that are executable by the one or more processors to perform at last the following:
       identify a system setting enabling leap second support;
       identify that a positive leap second should be added to the end of a chosen date;
       based on the system setting enabling leap second support, and based on the occurrence of the positive leap second, expose to a first application a first conversion component that presents, over a period of two seconds of actual time, a last second of the chosen date as if it is one second of system time; and
       based on the system setting enabling leap second support, based on the occurrence of the positive leap second, and based on a second application opting in to leap seconds, expose to the second application a second conversion component that presents an extra 61st second of system time at the end of a last minute of the chosen date.

12. The computer system as recited in claim 11, wherein the second application opts in to leap seconds based on the second application making an application programming interface (API) call.

13. The computer system as recited in claim 12, wherein the API call is available to the second application based on the system setting enabling leap second support having been set.

14. The computer system as recited in claim 11, wherein the second application opts in to leap seconds based on the second application expressing an application-specific configuration setting preference.

15. The computer system as recited in claim 11, wherein an indication of the occurrence of the positive leap second is received from a remote computer system and stored in durable storage at the computer system.

16. The computer system as recited in claim 11, wherein presenting the last second of the chosen date as if it is one second of system time comprises presenting each exposed unit of system time making up the last second of the chosen date over a period of two corresponding units of actual time.

17. The computer system as recited in claim 11, wherein the system setting enabling leap second support persists across reboots.

18. The computer system as recited in claim 11, the computer-executable instructions also including instructions that are executable by the one or more processors to maintain a counter used by the first and second conversion components.

19. The computer system as recited in claim 18, wherein the first and second conversion components provide different interpretations of the counter.

20. A computer program product comprising one or more hardware storage devices having stored thereon computer-executable instructions that are executable by one or more processors to expose a leap second to a plurality of applications executing at the computer system, the computer-executable instructions including instructions that are executable by the one or more processors to perform at last the following:

identify a system setting enabling leap second support;

identify that a positive leap second should be added to the end of a chosen date;

based on the system setting enabling leap second support, and based on the occurrence of the positive leap second, expose to a first application a first conversion component that presents, over a period of two seconds of actual time, a last second of the chosen date as if it is one second of system time; and based on the system setting enabling leap second support, based on the occurrence of the positive leap second, expose to a second application a second conversion component that presents an extra 61st second of system time at the end of a last minute of the chosen date.

\* \* \* \* \*